(12) United States Patent
Ishida et al.

(10) Patent No.: US 7,938,566 B2
(45) Date of Patent: May 10, 2011

(54) AUTOMOBILE INSTRUMENT PANEL COVER PANEL

(75) Inventors: Hirokazu Ishida, Niiza (JP); Tomoki Kawamura, Niiza (JP); Yoku Tahira, Niiza (JP)

(73) Assignee: Honda Access Corporation, Saitama (JP)

( * ) Notice: Subject to any disclaimer, the term of this patent is extended or adjusted under 35 U.S.C. 154(b) by 305 days.

(21) Appl. No.: 12/250,701

(22) Filed: Oct. 14, 2008

(65) Prior Publication Data

US 2009/0196058 A1 Aug. 6, 2009

(30) Foreign Application Priority Data

Feb. 4, 2008 (JP) ................. 2008-024073

(51) Int. Cl.
*B60Q 1/26* (2006.01)
(52) U.S. Cl. ........ 362/488; 362/471; 362/482; 362/489; 362/490
(58) Field of Classification Search .................. 362/471, 362/482, 488–490
See application file for complete search history.

(56) References Cited

U.S. PATENT DOCUMENTS

| | | | | |
|---|---|---|---|---|
| 7,507,008 B2* | 3/2009 | Clauw et al. | ................... | 362/489 |
| 7,637,623 B2* | 12/2009 | Wang et al. | ...................... | 362/30 |
| 2004/0085746 A1* | 5/2004 | Chen | ................................ | 362/26 |
| 2009/0009983 A1* | 1/2009 | Eich | ................................ | 362/29 |

FOREIGN PATENT DOCUMENTS

| | | |
|---|---|---|
| JP | 58-78237 U | 5/1983 |
| JP | 2006-076557 A | 3/2006 |
| JP | 2007-106303 A | 4/2007 |

OTHER PUBLICATIONS

Japanese Office Action dated Dec. 18, 2009, issued in corresponding Japanese Patent Application No. 2008-024073.
Japanese Office Action dated Sep. 21, 2010, issued in corresponding Japanese Patent Application No. 2008-024073.

* cited by examiner

*Primary Examiner* — Stephen F Husar
*Assistant Examiner* — James W Cranson
(74) *Attorney, Agent, or Firm* — Westerman, Hattori, Daniels & Adrian, LLP

(57) ABSTRACT

There is provided a cover panel including a lighting device which is attachable without a mounting seat. A cover panel 1 includes a panel main body 5 fixed on an instrument panel 3 in an interior of an automobile and a lighting device 6 provided inside the panel main body 5. The panel main body 5 comprises an opening 7 which forms a gap between itself and the instrument panel 3, and light emitted through the opening 7 from the lighting device 6 illuminates the interior of the automobile. The panel main body 5 and the lighting device 6 are integrated and are fixed on the instrument panel 3, so that the cover panel 1 including the lighting device 6 can be fixed on the instrument panel 3 without utilizing the mounting seat as was conventionally done.

7 Claims, 6 Drawing Sheets

AUTOMOBILE INSTRUMENT PANEL COVER PANEL

BACKGROUND OF THE INVENTION

1. Field of the Invention

The present invention relates to an ornamental cover panel provided in an interior of a vehicle such as that of an automobile, particularly to a cover panel having a lighting device thereinside for illuminating the vehicle interior.

2. Description of the Related Art

Heretofore, as this type of a cover panel provided in a vehicle interior, there has been proposed a cover panel fixed on an instrument panel. The instrument panel makes up a front of the vehicle interior, i.e., a front of a driver's seat, a center console and a front of a passenger's seat. Also the instrument panel holds various meters such as a speed meter or the like, and an air outlet for an air-conditioner and a globe box or the like are installed in the instrument panel.

Color tone and texture of the instrument panel are coordinated according to types of automobiles and users' preferences. For example, using the instrument panel made of black hard-synthetic resin may create a relaxed atmosphere in the vehicle interior. Moreover, in order to add an accent to a thus coordinated atmosphere, an ornamental panel may be integrated with a part of the instrument panel. The ornamental panel can give an accent to an aspect of the instrumental panel by employing an aluminum tone or a woody tone therein to enable a different atmosphere to be created in the vehicle interior.

With respect to the vehicle interior in the atmosphere thus coordinated, some users desire to differentiate their vehicles from others' ones and to go for their originalities. It is, however, difficult to meet this kind of user's desire by modifying the ornamental panel due to the integral formation of the ornamental panel with the instrument panel.

Therefore, a cover panel is further used which is fixed on the surface of the instrumental panel or ornamental panel by a double-stick tape or the like. By fixing this cover panel on the surface of a part of the instrument panel, the preliminarily coordinated vehicle interior atmosphere as the aforementioned can be changed, so that the users can readily change an atmosphere of the vehicle interior to suit their tastes.

Additionally, in late years, an instrument panel is desired to make a vehicle interior more distinctive not only by changing the color tone and the texture on the surface of the panel but also by providing a lighting device, the lighting device being used not only as a vehicle interior lighting but also as illuminations.

As a conventional art in which a lighting device is used as illuminations, one disclosure (e.g., Japanese unexamined patent publication No. 2006-76557) can be found where a lighting device with a light guiding capability is arranged in a vehicle interior front section formed by a front glass and a side glass behind the front glass and is disposed in an instrument panel located at a lower side of the front glass.

According to the above conventional art, a step acting as a mounting seat is provided in the instrument panel and then the lighting device is disposed inside the step, so that such an effect can be exerted that lighting does not directly come into the view of a driver sitting in a front seat of the vehicle interior.

However, the conventional art has the problem of lack of versatility because as being disposed on the step preliminarily formed on the instrument panel, the lighting device cannot be disposed on an instrument panel without a step.

SUMMARY OF THE INVENTION

Therefore, in view of the above problem, it is an object of the present invention to provide a cover panel including a lighting device which can be attached to an instrument panel even if the cover panel has no mounting seat.

In order to achieve the above object, a first aspect of the present invention is a cover panel which includes a panel main body fixed on an instrument panel in a vehicle interior and a lighting device provided inside the panel main body in which said panel main body has an opening forming a gap between itself and the instrument panel so that the lighting device emits light from the opening to the vehicle interior.

A second aspect of the present invention is a cover panel of the first aspect in which the lighting device includes a light guide body and a light emitter provided in one end of the light guide body, said light guide body being disposed along the opening.

A third aspect of the present invention is a cover panel of the first or second aspect in which the lighting device is held inside the panel main body by a supporting member, and the supporting member is made of a soft material.

According to the cover panel in the first aspect of the present invention, the panel main body and the lighting device are integrated and are fixed on an instrument panel, so that the cover panel including a lighting device can be fixed on the instrument panel without utilizing the mounting seat as was conventionally done. Therefore, a degree of freedom of mounting the cover panel increases, making it possible to add a lighting function to the instrument panel without spoiling design of the cover panel.

Further, according to the cover panel in the second aspect of the present invention, the light guide body is disposed along the opening of the panel main body, so that a light emitter can efficiently emit light outward. Thus, the power consumption can be decreased.

Furthermore, according to the cover panel in the third aspect of the present invention, vehicle vibrations transmitted to the lighting device can be reduced, and even if a load is applied to the cover panel, the cover panel prevents the load and vibrations from being transmitted directly to the lighting device by absorbing the load and vibrations. Thus, durability of the lighting device can be increased.

BRIEF DESCRIPTION OF THE DRAWINGS

A better understanding of the present invention can be obtained when the following detailed description of an exemplary embodiment is considered in conjunction with the following drawings, in which.

DETAILED DESCRIPTION OF THE INVENTION

Figure 1:
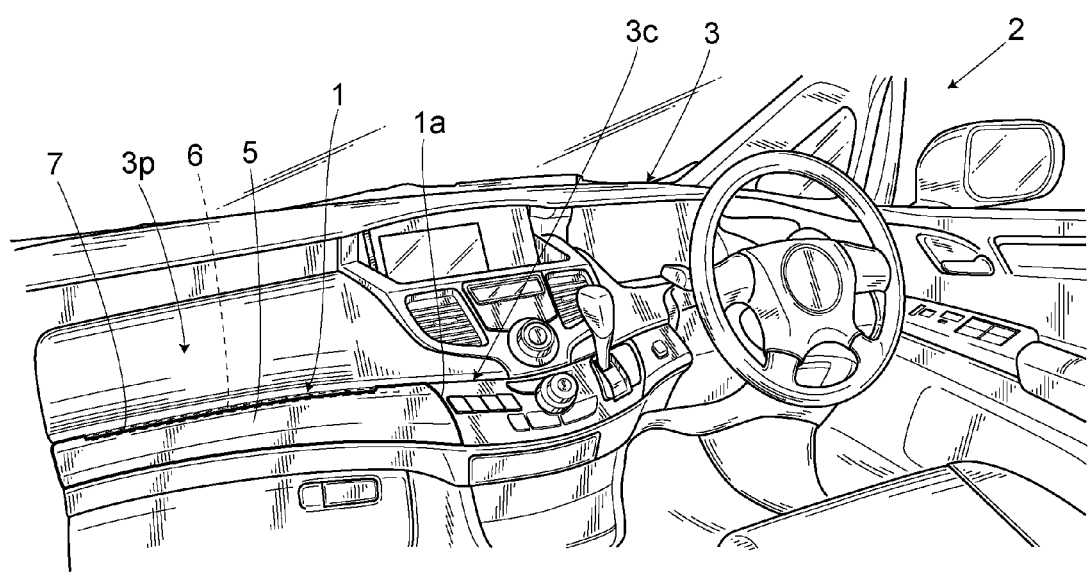
FIG. 1 is a perspective view illustrating a cover panel in use according to the present embodiment.

Hereinafter, a preferred embodiment of the present invention will be described with reference to the accompanying drawings. A cover panel 1 shown in FIG. 1 is fixed on a front surface of a front passenger seat portion 3d of an instrument panel 3 provided in an interior of an automobile 2. The cover panel 1 is formed in a band form, and its longitudinal direction is disposed so as to align with a horizontal direction of the automobile. A lighting device described later is provided inside the cover panel 1. In this way, the cover panel 1 gives an accent to the instrument panel 3 the color tone and texture of which are already coordinated, while allowing the lighting device to provide light inside the vehicle interior.

Figure 2:
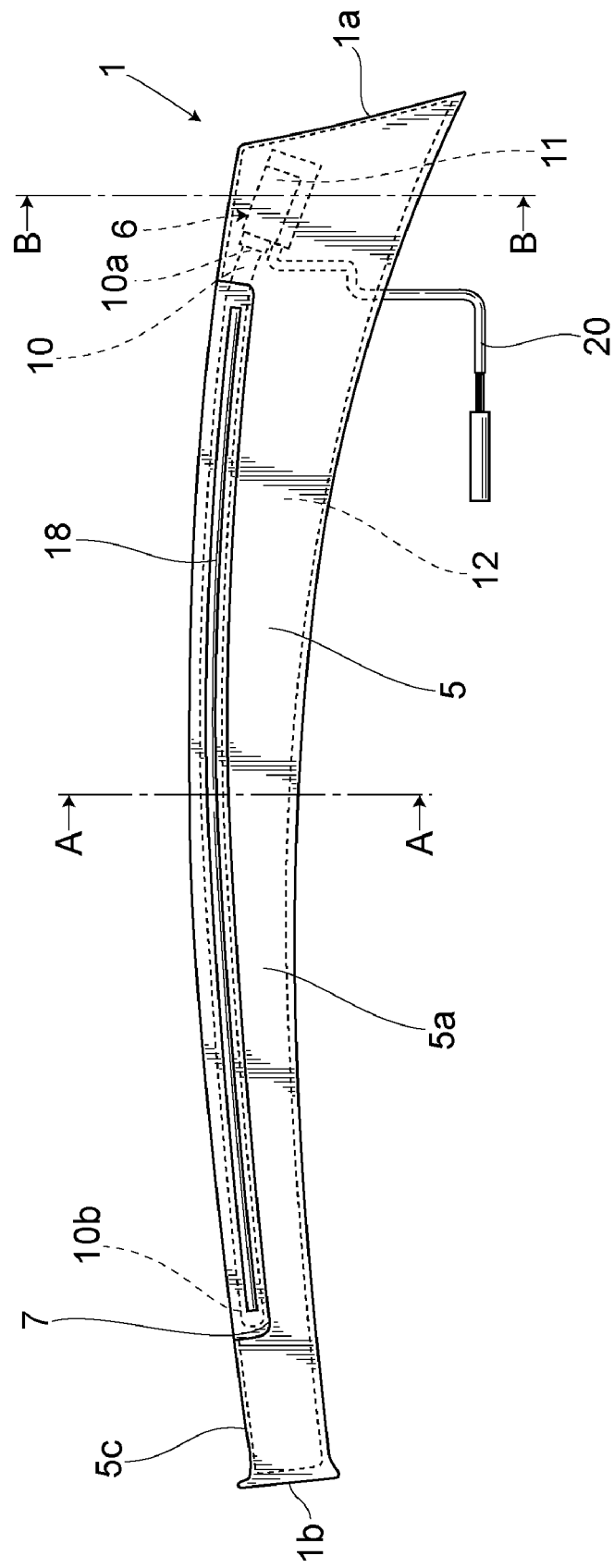
FIG. 2 is a front elevation view illustrating a structure of the cover panel according to the present embodiment.

As shown in FIG. 2, the cover panel 1 comprises a panel main body 5 made of a horizontally-elongated tabular member formed from a hard-synthetic resin; and the lighting device 6 provided inside the panel main body 5. Ornamentation such as aluminum-like metal coloring or wood graining is applied on a first surface 5a of the panel main body 5. An opening 7 acting as a window through which the light from the lighting device 6 passes is formed on one side. A side 5c of the panel main body 5 which is located at an upside with respect to the vehicle when fixed on the instrument panel 3 is concavely cut out, thus forming the opening 7. Further, the first surface 5a of the panel main body 5 is formed so as to gently slope in a manner gradually curved as it approaches an opposite edge thereof. The lighting device 6 comprises a light guide body 10 and a light emitter 11, and is fixed on the panel main body 5 through a supporting member 12.

Figure 3:
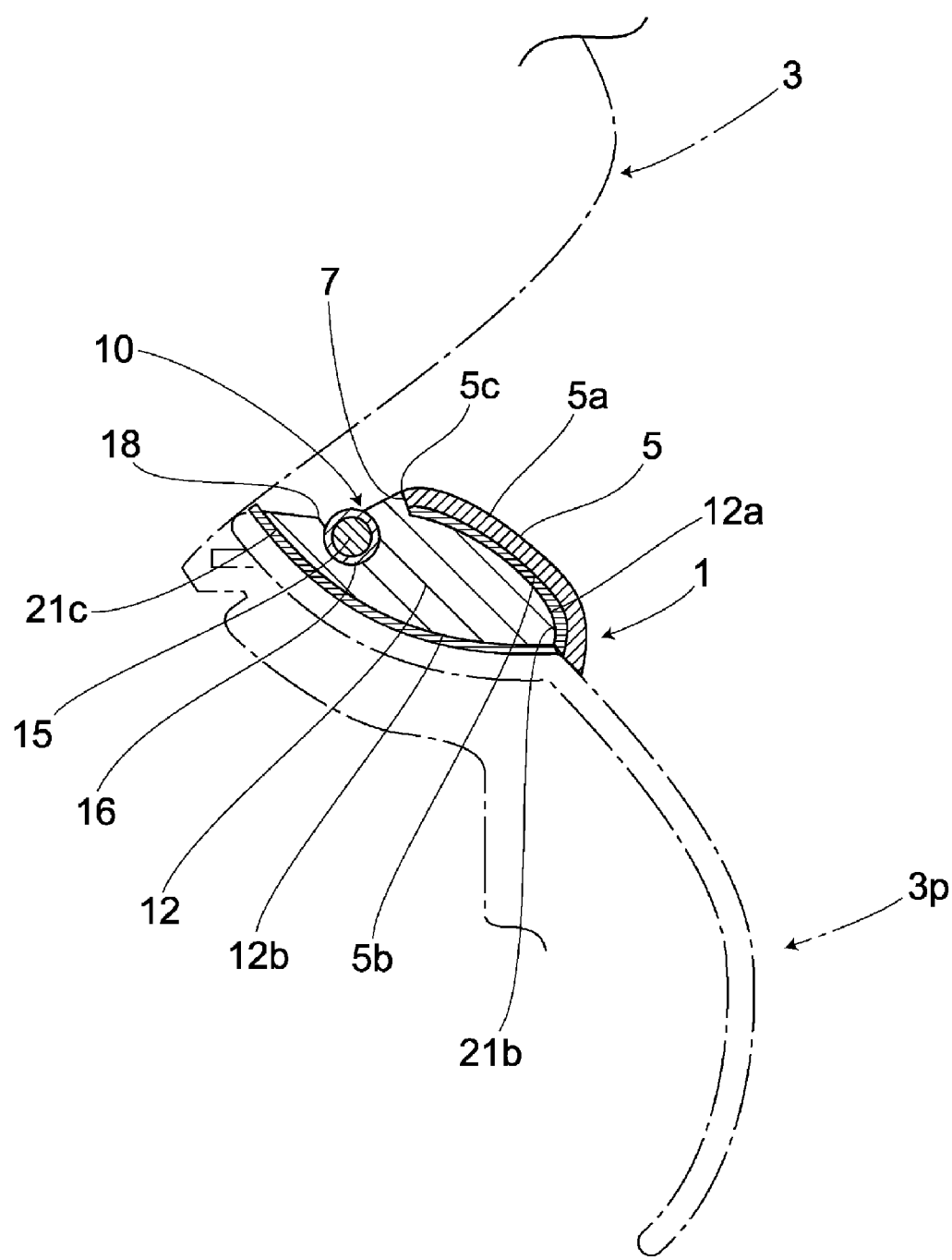
FIG. 3 is a sectional view illustrating the structure of the cover panel according to the present embodiment, taken on an A-A line of FIG. 2.
Figure 4:
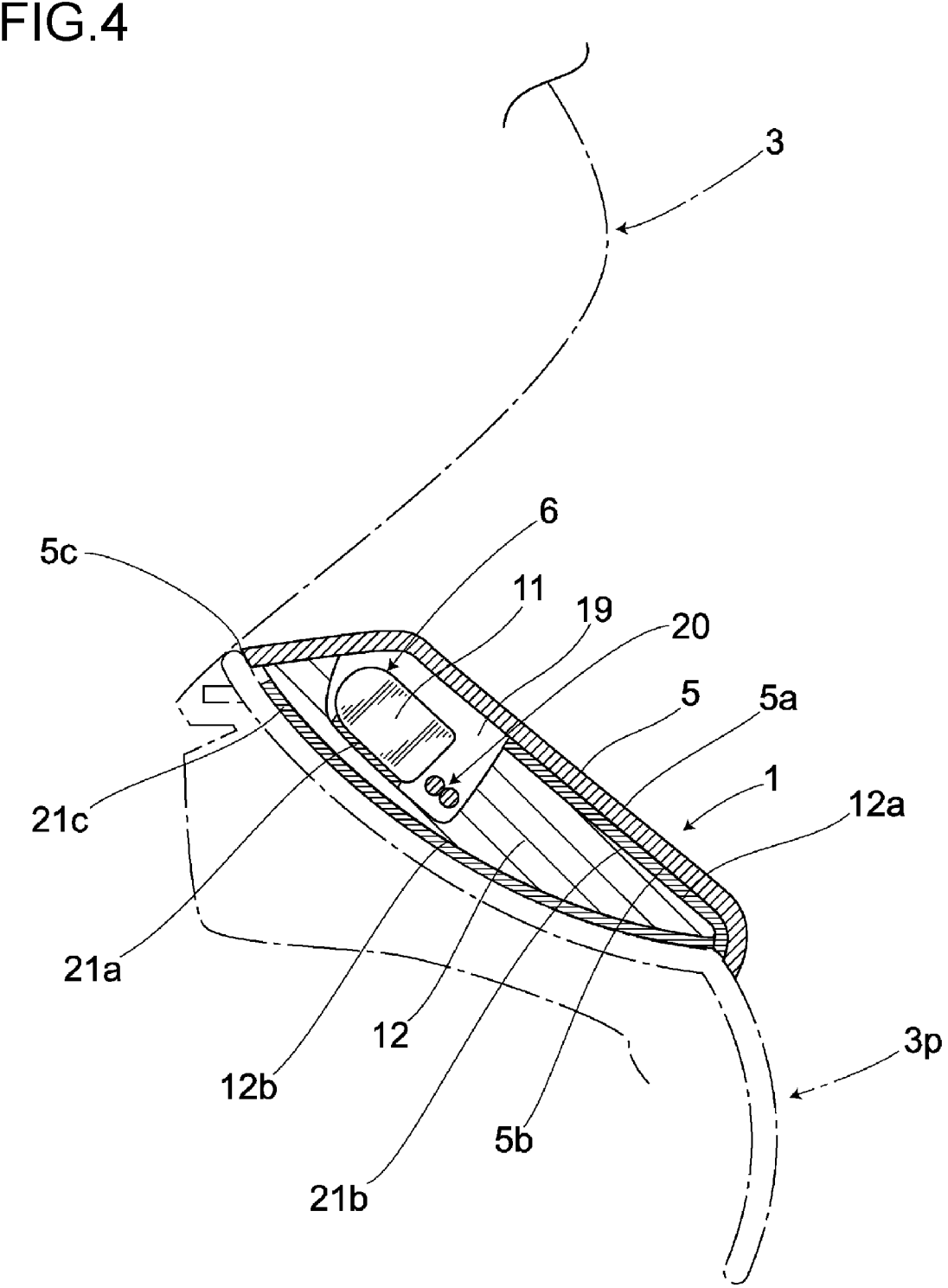
FIG. 4 is a sectional view illustrating the structure of the cover panel according to the present embodiment, taken on a B-B line of FIG. 2.

As shown in FIGS. 3 and 4, the lighting device 6 is provided on a second surface 5b, i.e., an inside surface of the panel main body 5. The light guide body 10 is made of a linear member and includes a core 15 and a clad 16. In the meantime, two or more light guide bodies 10 may be provided although FIG. 3 illustrates one light guide body only.

The clad 16 is formed from fluororesin into a tubular form. The clad 16 thus formed has flexibility or ductility, so that three-dimensional deformation of the clad 16 can be relatively easily achieved. Furthermore, the core 15 is also formed from a material having flexibility or ductility into a cylindrical form. Specifically, the core 15 may be made of polymer such as copolymer of polyoxypropylenetriol and hexamethylenediisocyanate. For a material of the supporting member 12, a fluororesin or EPDM having flexibility and ductility is used in the same way as the clad 16.

The core 15 cylindrically shaped is inserted into the clad 16 cylindrically formed to thereby form the light guide body 10. The light guide body 10 is fixed on and supported by the supporting member 12 having a cutout 18 provided along its longitudinal direction.

The supporting member 12 is provided with the cutout 18 on a portion corresponding to the aforesaid first surface 5a which is located at the upside when the supporting member 12 is fixed to the instrument panel 3. The light guide body 10 is fitted into the cutout 18. After fitting the light guide body 10 thereinto, a part of a circumference of the light guide body 10 is exposed from the cutout 18, and thus light is allowed to be emitted from a light-emitting face of the cutout 18. Moreover, since the supporting member 12 is also made of the material having flexibility and ductility as is done the light guide body 10, the fixing of the light guide body 10 to the cutout 18 provided in the supporting member 12 can be ensured to a sufficient extent by its own elasticity of the flexible material.

As shown in FIG. 4, a light source which utilizes, e.g., an LED as the light emitter 11 is provided on one end of the supporting member 12. Although one or more light emitters 11 can be used according to a diameter of the light guide body 10, one light emitter will normally suffice. The light emitter 11 is attached onto a printed-circuit board (not shown), and a wire harness 20 which feeds an electrical power from a battery is coupled to the printed-circuit board. The light emitter 11 is fixed on a mounting recess 19 formed on the supporting member 12 using a double-stick tape 21a, while it is connected to one end 10a of the light guide body 10, to thereby emit light from one end 10a of the light guide body 10 to the other end 10b thereof.

With the light guide body 10 set in conformity to the opening 7 of the panel main body 5, the supporting member 12 with the lighting device 6 fixed thereon allows a first surface 12a thereof to be adjoined to the second surface 5b of the panel main body 5, and then fixed there using the double-stick tape 21b. In this way, the lighting device 6 and the panel main body 5 are integrated with each other, thus obtaining the cover panel 1.

The cover panel 1 is fixed using a double-stick tape 21c on a place where a second surface 12b of the supporting member 12 abuts on the surface 3p of the instrument panel 3 opposite to the front passenger seat so that one end 1a on which the light emitter 11 is provided may be located on a side of a center console 3c of the instrument panel 3 while the other end 1b on which the light emitter 11 is not provided may be located on a side near a vehicle door. In addition, the wire harness 20 is electrically coupled to a battery (not shown) mounted on the automobile 2 through cables (not shown).

As described above, according to the cover panel 1 of the present embodiment, the lighting device 6 is fixed on the second surface 5b of the panel main body 5 using the double-stick tape so that the panel main body 5 and the lighting device 6 are integrated with each other, and then the body thus integrated is fixed on the instrument panel 3 using the double-stick tape 21c. This enables the cover panel 1 including the lighting device 6 to be fixedly mounted on the instrument panel 3 without utilizing the conventional mounting seat. Therefore, the cover panel 1 can be easily fixed on the instrument panel 3, thus enabling its versatility to be improved.

Further, according to the cover panel 1 of the present embodiment, the lighting device 6 is fixed on the second surface 5b of the panel main body 5 using the double-stick tape so as to be integrated therewith, so that the light of the light guide body 10 is allowed to be emitted from the opening 7 provided on the panel main body 5. Thus, the light can be used for indirect lighting, enabling the lighting device 6 to be provided as a one emitting soft light.

Furthermore, according to the cover panel 1 of the present embodiment, the light guide body 10 is disposed near the outer edge of the panel main body 5. Thus, the light of the light emitter 11 can be efficiently emitted outward, enabling its power consumption to be decreased.

Moreover, according to the cover panel 1 of the present embodiment, the light guide body 10 is disposed near the outer edge of the panel main body 5, and thus, rigidity of the panel main body 5 can be improved.

Further, since the supporting member 12 is formed from the material having flexibility and ductility, the vibrations of the automobile 2 transmitted to the lighting device 6 can be decreased; and even when a load is applied to the cover panel 1, the supporting member 12 is allowed to absorb the load to thereby prevent the vibrations and load from transmitting directly to the lighting device 6. Thus, the durability of the lighting device 6 can be improved.

The present invention is not limited to the foregoing embodiment, and, various modifications are possible within the scope of the gist of the present invention. For example, whilst an LED is used as the light emitter 11 in the foregoing embodiment, the present invention is not limited thereto, and other light sources such as an electrical bulb may be used. Further, whilst the light guide body 10 is described as having a circular section in the foregoing embodiment, the present invention is not limited thereto, but the light guide body 10 may have an oval or polygonal section. Furthermore, whilst the panel main body is made of hard-synthetic resin in the foregoing embodiment, the present invention is not limited thereto, but it may be made of a metal such as aluminum or the like, or made of wood.

Figure 5:
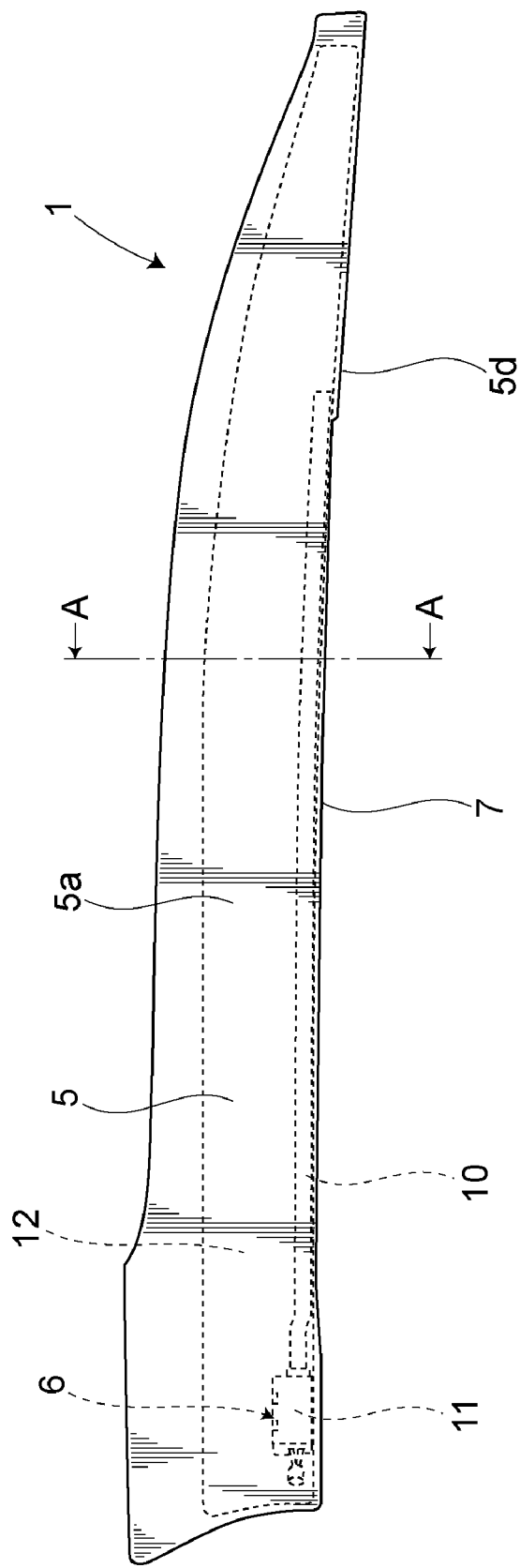
FIG. 5 is a front elevation view illustrating a modification of the cover panel according to the present embodiment.
Figure 6:
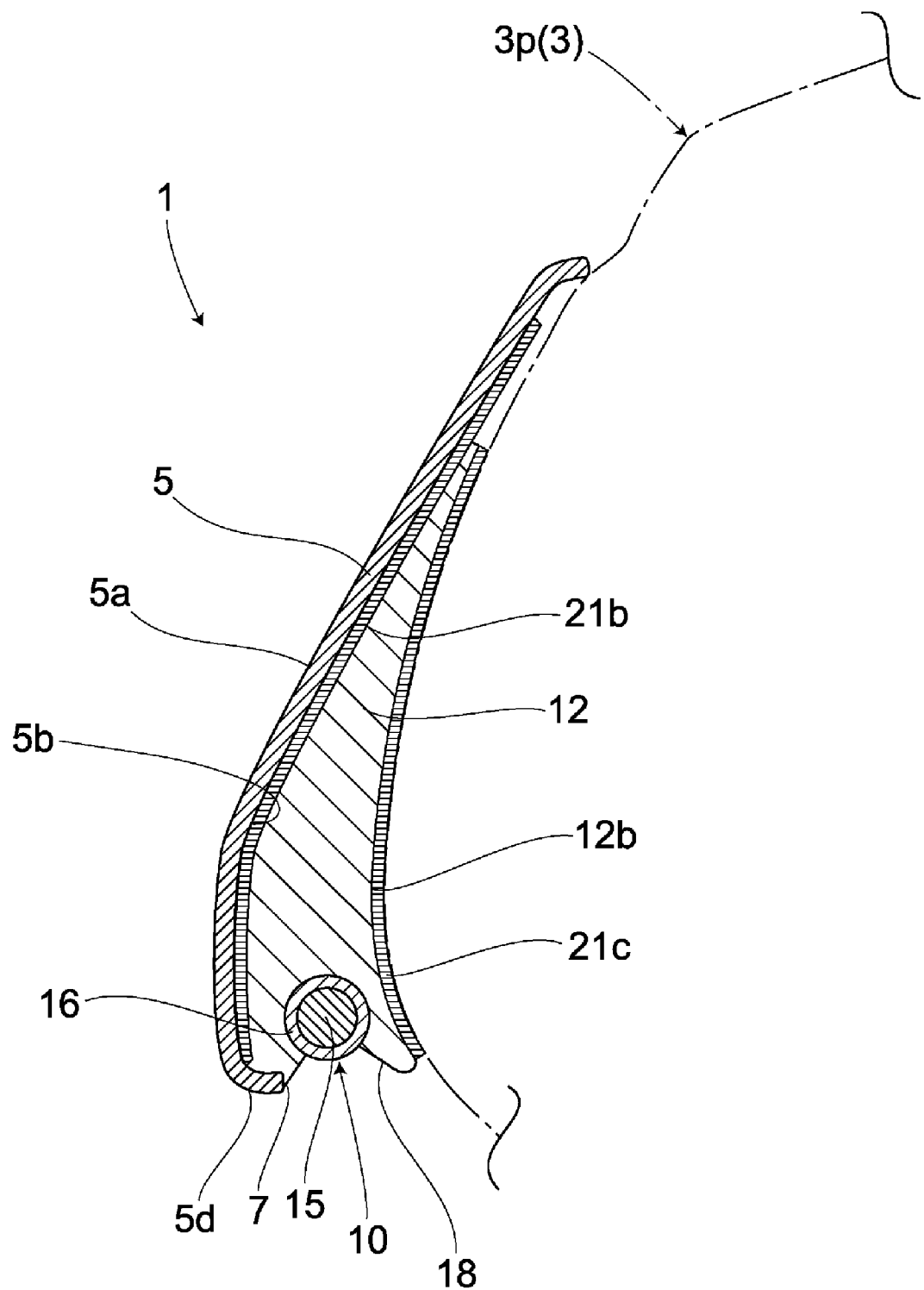
FIG. 6 is a sectional view illustrating the modification of the cover panel according to the present embodiment, taken on an A-A line of FIG. 5.

In the foregoing embodiment, the opening 7 is provided on the upper side 5c of the panel main body 5 which is located on the upper side of the automobile 2 when the panel main body 5 is fixed on the instrument panel 3 so that light is emitted from the upper edge of the panel main body 5. However, the present invention is not limited to this configuration. For example, as shown in FIGS. 5 and 6, the opening 7 may be provided on a lower side 5d of the panel main body 5 which is located on the lower side of the automobile 2 when the panel main body 5 is fixed on the instrument panel 3 so that light may be emitted from the lower edge of the panel main body 5. In this way, the light guide body 10 is allowed not to come in view of a user sitting on the driver's or passenger's seat, thus enabling it to be used as an indirect lighting even more reliably.

Furthermore, in the above-described embodiment, the opening is formed by cutting out one side of the panel main body in the concave shape. However, the present invention is not limited thereto, but various other configurations may be employed as long as they can provide an aperture for allowing light from the light guide body to pass therefrom between the second surface of the panel main body and the surface of the instrument panel.

What is claimed is:

1. A cover panel including a panel main body fixed on an instrument panel in an interior of an automobile and a lighting device provided inside the panel main body, wherein said lighting device includes a light guide body and a light emitter provided at an end of said light guide body, and said panel main body has a first surface and a second surface and comprises an opening that forms a gap between itself and said instrument panel, and said light guide body is disposed along said opening so that light emitted through said opening by said lighting device illuminates the interior of the automobile.

2. The cover panel according to claim 1, wherein said lighting device is held inside said panel main body by a supporting member, said supporting member being made of a soft material.

3. The cover panel according to claim 2, wherein said supporting member is provided with a cutout on a portion corresponding to the first surface of said panel main body which is located at an upper side when said supporting member is fixed to the instrument panel so that said light guide body is fitted into said cutout.

4. The cover panel according to claim 1, wherein said panel main body and said lighting device are integrated with each other by fixing said lighting device on the second surface of said panel main body, and said body thus integrated is fixed on said instrument panel.

5. The cover panel according to claim 1, wherein said light guide body is disposed near an outer edge of said panel main body.

6. The cover panel according to claim 1, wherein one or more light emitters are provided according to a diameter of said light guide body.

7. A cover panel, comprising:
a panel main body fixed on an instrument panel in an interior of an automobile said panel main body has,
a first surface and
a second surface,
a lighting device provided inside said panel main body,
wherein said panel main body includes an opening that forms a gap between itself and said instrument panel so that light emitted through said opening by said lighting device directly illuminates the interior of the automobile.

* * * * *